United States Patent
Tassinari et al.

(10) Patent No.: US 12,196,329 B2
(45) Date of Patent: Jan. 14, 2025

(54) REED VALVE

(71) Applicant: MOTO TASSINARI, INC., West Lebanon, NH (US)

(72) Inventors: Steven M. Tassinari, Meriden, NH (US); Michael Ewaschuk, White River Junction, VT (US)

(73) Assignee: Moto Tassinari, Inc., West Lebanon, NH (US)

( * ) Notice: Subject to any disclaimer, the term of this patent is extended or adjusted under 35 U.S.C. 154(b) by 0 days.

(21) Appl. No.: 18/159,695

(22) Filed: Jan. 26, 2023

(65) Prior Publication Data

US 2023/0235827 A1     Jul. 27, 2023

Related U.S. Application Data

(60) Provisional application No. 63/303,668, filed on Jan. 27, 2022.

(51) Int. Cl.
| | |
|---|---|
| *F16K 15/14* | (2006.01) |
| *F02M 26/70* | (2016.01) |
| *F16K 15/16* | (2006.01) |

(52) U.S. Cl.
CPC ............ *F16K 15/14* (2013.01); *F02M 26/70* (2016.02); *F16K 15/1401* (2021.08); *F16K 15/16* (2013.01)

(58) Field of Classification Search
CPC ...... F01L 3/205; F16K 15/1401; F16K 15/16; Y10T 137/6086; F02M 26/70
See application file for complete search history.

(56) References Cited

U.S. PATENT DOCUMENTS

| | | | | |
|---|---|---|---|---|
| 3,412,754 | A | * | 11/1968 | Schou ..................... F16K 15/16 |
| | | | | 137/454.2 |
| 4,879,976 | A | * | 11/1989 | Boyesen ................... F02F 1/22 |
| | | | | 123/73 V |
| 6,609,535 | B2 | * | 8/2003 | Oppermann ............ F16K 15/16 |
| | | | | 123/73 V |
| 6,880,577 | B2 | | 4/2005 | Tassinari et al. |
| 7,028,649 | B1 | | 4/2006 | Hosaluk et al. |
| 7,614,422 | B2 | | 11/2009 | Tassinari et al. |
| 7,963,265 | B2 | | 6/2011 | Tassinari et al. |

(Continued)

OTHER PUBLICATIONS

International Search Report and Written Opinion of International Appln. No. PCT/US23/61319, mail date Jun. 14, 2023, 9 pages.

*Primary Examiner* — Kevin F Murphy
(74) *Attorney, Agent, or Firm* — Grossman, Tucker, Perreault & Pfleger, PLLC; Paul J. Kroon, Jr.

(57) ABSTRACT

A reed valve assembly includes a retainer, one or more reed cages, and a plurality of reed petals. The retainer includes a flange, first and second openings, and a center retainer separating the first and second openings. The reed cages are configured to be advanced from the bottom of the retainer and partially through the first and second openings of the retainer and have at least two inner openings generally facing each other and at least two outer openings generally facing away from each other. The inner and outer openings are configured to be fluidly coupled to the first and second openings of the retainer. The reed petals are configured to extend over the inner openings and the outer openings. The center retainer and reed cages include one or more reed cage grooves and reed cage flanges configured secure the reed cages to the retainer.

10 Claims, 19 Drawing Sheets

(56) References Cited

U.S. PATENT DOCUMENTS

| | | | |
|---|---|---|---|
| 9,624,878 B2* | 4/2017 | Hambloch | F16K 15/16 |
| 11,454,162 B2 | 9/2022 | Tassinari et al. | |
| 2003/0209275 A1 | 11/2003 | Tassinari et al. | |
| 2012/0227847 A1 | 9/2012 | Mohamed | |
| 2019/0003604 A1 | 1/2019 | Mohamed | |
| 2021/0285363 A1 | 9/2021 | Tassinari et al. | |

* cited by examiner

REED VALVE

CROSS REFERENCE TO RELATED APPLICATIONS

The present disclosure claims the benefit of U.S. Provisional Patent Application Ser. No. 63/303,668 filed Jan. 27, 2022, which is fully incorporated herein by reference.

TECHNICAL FIELD

The present invention relates to the field of engine parts. Specifically, the present invention relates to the field of reed valve assemblies. More specifically, the present invention is directed at reed valve assemblies used in 2-stroke and 4-stroke motors.

BACKGROUND INFORMATION

Reed valves have been used in two stroke engine applications to control the fuel-air mixture into to the cylinder. Operation of the engine (e.g., movement of the piston within the cylinder) causes a change in the intake pressures. For example, as the piston moves a first direction, a pressure differential is created across the reed valve that causes the reed valve to open and allow the fuel-air mixture to flow into the cylinder. As the piston moves in the opposite direction, the resulting pressure change causes the reed valve to close and generally prevent the flow of air/fuel into the cylinder.

FIG. 1 is one example of a 2-stroke motor reed valve commercially available by Moto Tassinari, Inc. and generally described in U.S. Pat. No. 6,880,577, which is fully incorporated herein by reference. The reed valve assembly 10 includes a retainer 12, a W-shaped reed cage 14, pliable reed petals (e.g., outer reed petals 16a and inner reed petals 16b, collectively reed petals 16), and optionally stoppers 18. The reed cage 14 is substantially hollow with a plurality of openings covered by the reed petals 16. In operation, air flows into the center of the retainer 12 and through the openings in the retainer 12, pushing the reed petals 16 back (e.g., towards the stoppers 18 which limit the movement of the reed petals 16). When the air reverses flow, the reed petals 16 press firmly against the reed cage 14, covering the openings and substantially impeding airflow.

The reed valve assembly 10 is designed such that the reed petals 16 pivot on the base 17 of the w-shaped reed cage 14 to open at the tip 19 of the reed cage 14, allowing airflow moving from the base 17 to the tip 19. When the reed petals 16 open, the opening at the tip 19 is approximately as wide as the base 17. The benefit of the reed cage 14 with a w-shape is that none of the reed petals 16 need to pivot as far as reed petals on a traditional reed valve to generate the same size opening at the tip 19. The reduced pivot reduces wear and tear on the reed petals 16 and increases the speed with which the reed petals 16 can react to changes in airflow direction. This speed is particularly important when the reed petals 16 are opening and closing more than 100 times per second.

The retainer 12 includes slots 11 configured to receive tabs 13 formed on the reed cage 14. The outer reed petals 16a include holes 15 configured to allow the tabs 13 to pass through and extend into the slots 11 of the retainer 12, thereby interlocking the retainer 12 to the reed cage 14 and securing the outer reed petals 16a in place.

The inner reed petals 16b are removably secured to the reed cage 14 by inserts 7. The inserts 7 are independently interlock with the reed cage 14 to hold the inner reed petals 16b in place. The only difference between the inner reed petals 16a and outer reed petals 16b in this embodiment is the addition of the inserts 7. Unlike the outer reed petals 14a which are sandwiched between reed cage 14 and the retainer 12, the inner petals 16b are both disposed in the valley 5 of the W-shaped reed cage 14, and as such, otherwise face each other. The insert 7 provides a surface on the opposite side of the inner reed valves 16b opposite the reed cage 14. In particular, the insert 7 is slid from the side (as shown in FIG. 1) of the reed valve assembly 10 into a channel formed at the base 5 of the valley of the W-shaped reed cage 14. The insert 7 applies a compressive force that sandwiches the inner reed petals 16a against the reed cage 14, thereby ensuring that the tabs 13 remain within the holes 15 of the inner reed valves 16b and preventing the inner reed petals 16a from becoming loose. A first insert 7 is slide in from a first side of the reed valve assembly 10 and a second insert 7 is slide in from a second, opposite side of the reed valve assembly 10.

While the use of the separate inserts 7 is generally effective, a downside is that it increases the number of parts which must be assembled. As may be appreciated, the insert 7 must be slide into a tight tolerance channel, thereby making the assembly process more difficult and time consuming. In addition, the reed cage 14 is inserted into the retainer 12 through the bottom of the retainer 12 while the retainers 15 must be separately slide into the channel of the W-shaped reed cage through the left and first sides of the partially assembled reed valve assembly 10. The increased number of parts and additional assembly steps increases the manufacturing and labor costs and case result in manufacturing loss and errors.

BRIEF DESCRIPTION OF THE DRAWINGS

These and other features and advantages will be better understood by reading the following detailed description, taken together with the drawings, wherein.

DETAILED DESCRIPTION

By way of a general overview, the present disclosure is generally directed to an improved reed valve. The improved reed valve may include a retainer, one or more reed cages, and a plurality of reed petals. The retainer may include a flange, a first and a second openings, and a center retainer separating the first and second openings. The reed cages may be configured to be advanced from the bottom of the retainer and partially through the first and second openings of the retainer. The reed cages may have at least two inner openings generally facing each other and at least two outer openings generally facing away from each other. The inner openings and the outer openings may be configured to be fluidly coupled to the first and second openings of the retainer. The plurality of reed petals may be configured to extend over the two or more inner openings and two or more outer openings. The center retainer and the one or more reed cages may include one or more reed cage grooves and reed cage flanges configured secure the one or more reed cages to the retainer. The improved reed cage may eliminate the need for separate inserts to secure the reed cage and reed petals to the retainer. The improved reed cage may also be independently interlockable, e.g., without the use of tools.

Figure 2:
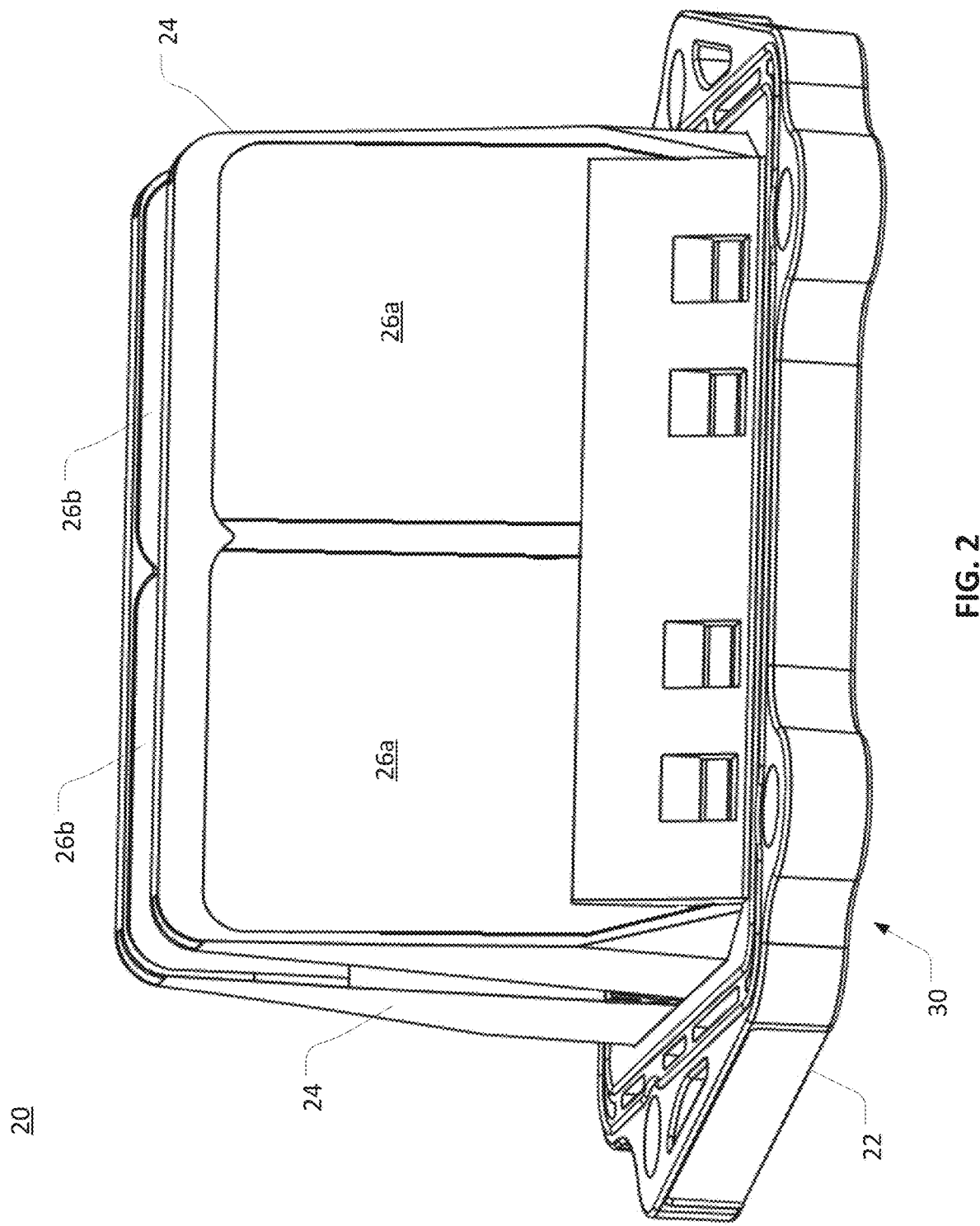
FIG. 2 shows an assembled reed valve assembly consistent with at least one example of the present disclosure.
Figure 3:
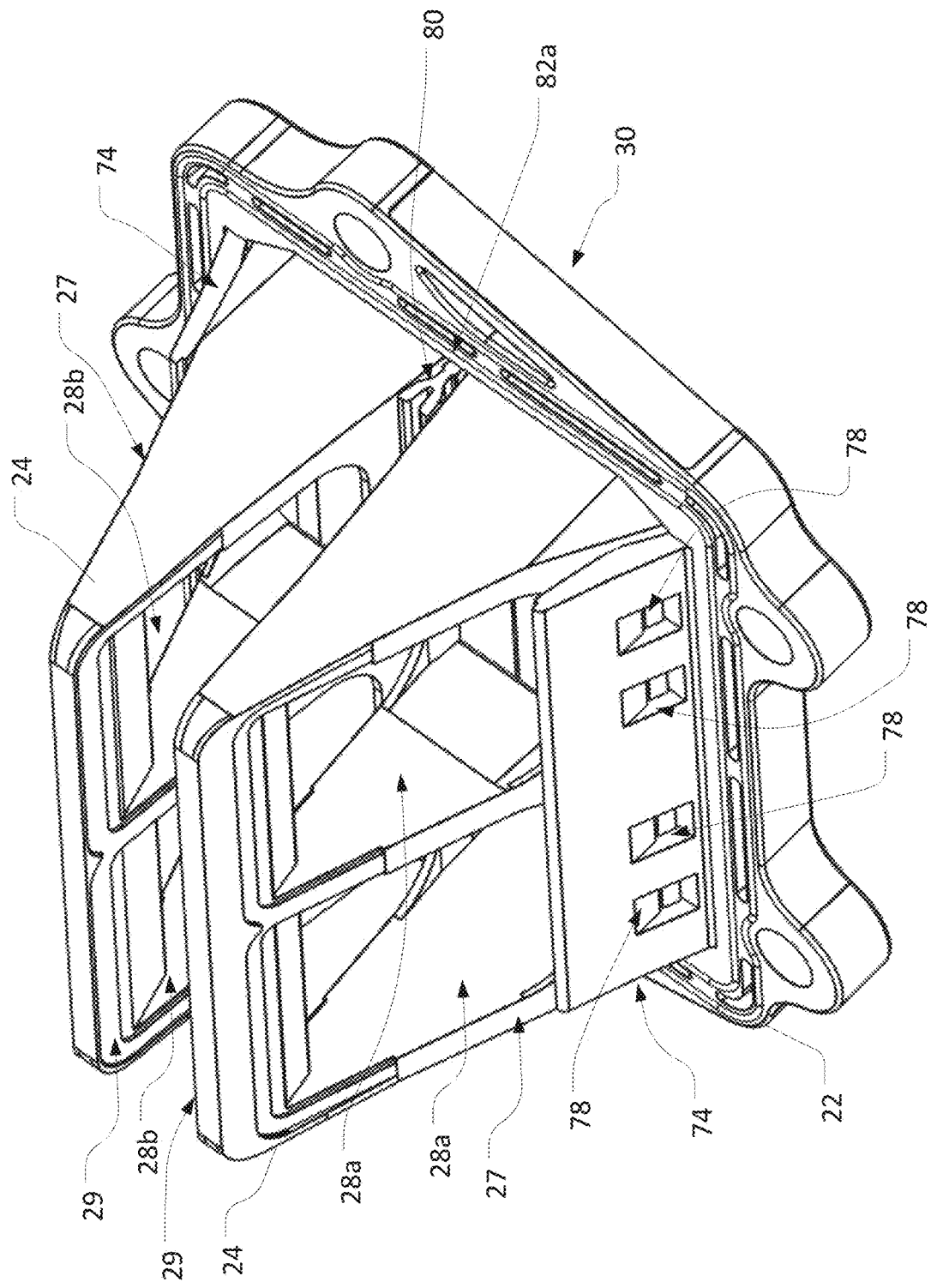
FIG. 3 shows the reed valve assembly of FIG. 2 without the reed petals.
Figure 4:
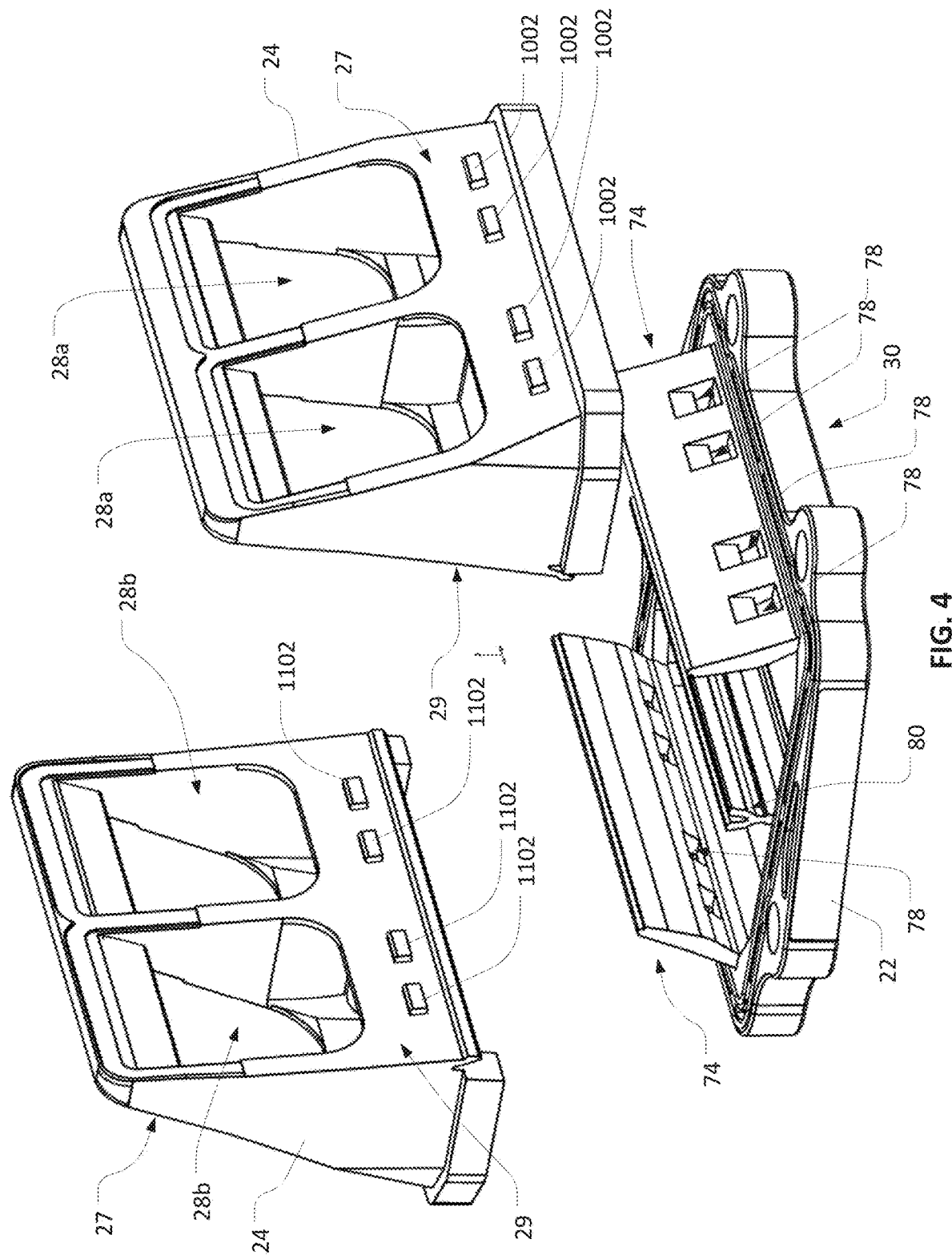
FIG. 4 shows an exploded view of the reed valve assembly of FIG. 2 without the reed petals.
Figure 5:
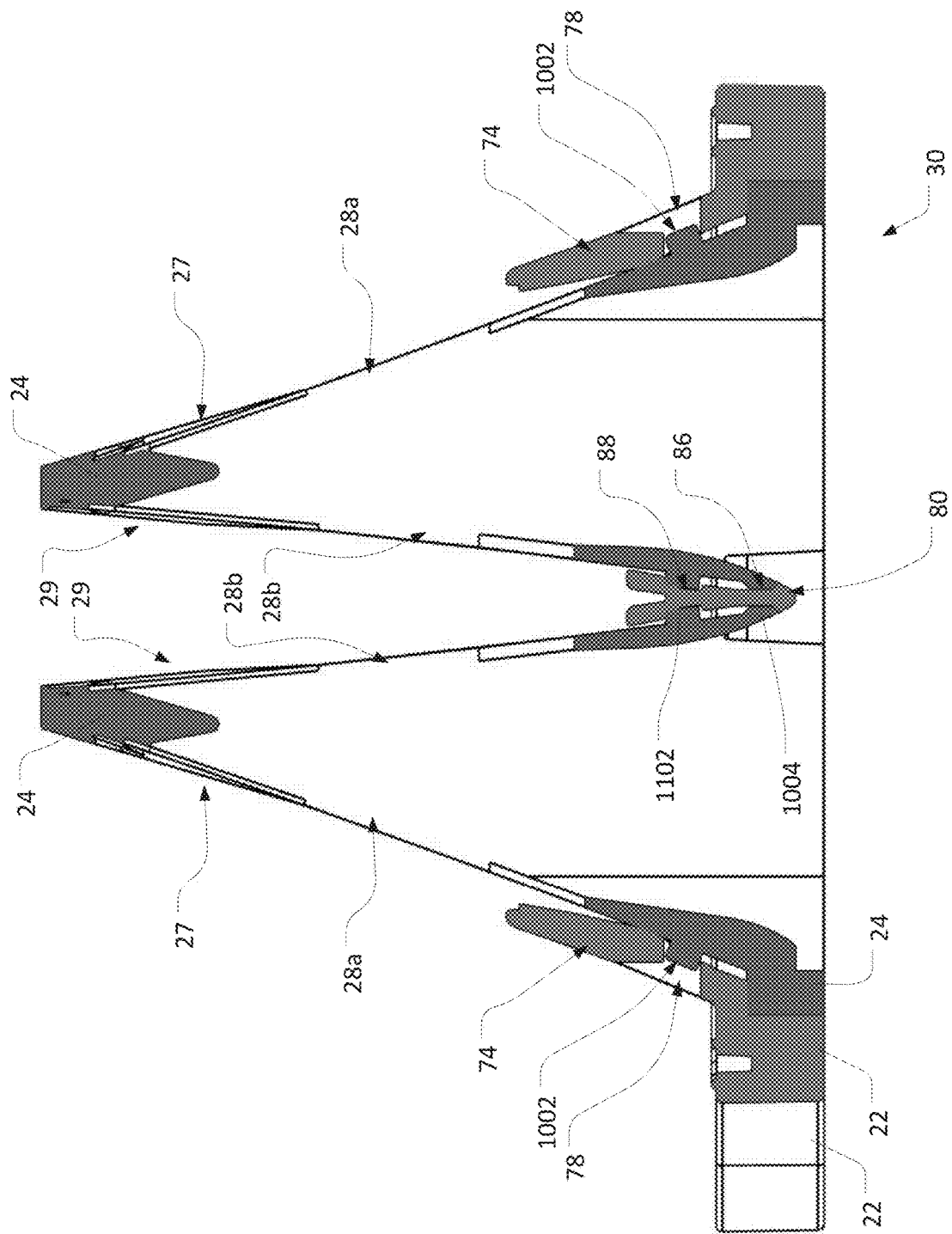
FIG. 5 is a cross-sectional view of the reed valve assembly of FIG. 2 without the reed petals.

FIGS. 2-5 show one example of an improved reed valve assembly 20 consistent with the present disclosure. In particular, FIG. 2 shows an assembled reed valve assembly 20 with the reed valves, FIG. 3 shows the reed valve assembly 20 without the reed petals, FIG. 4 shows an exploded view of the reed valve assembly 20 without the reed petals, and FIG. 5 is a cross-sectional view of the reed valve assembly 20 without the reed petals.

With reference to FIG. 2, the reed valve assembly 20 includes a retainer 22 (also known as a manifold), one or more reed cages 24, and a plurality of resiliently deformable reed petals 26a, 26b (collectively referred to as reed petals 26). In the illustrated example, two reed cages 24 are shown which collectively form a generally W-shaped cross-section having two or more outer openings 28a (e.g., as shown in FIG. 3) on the outside 27 of the W (selectively covered/sealed by one or more outer reed valves 26a) and two or more inner openings 28b on the inside 29 of the W (selectively covered/sealed by one or more inner reed petals 26b). The inner and outer openings 28a, 28b may be collectively referred to as openings 28. As may be appreciated, air may flow through the bottom 30 of the retainer 22 and through the openings 28 in the reed cage 24 when the reed petals 26 are in the unseated (e.g., open) position. When the reed petals 26 are in the seated (e.g., closed) position, the reed valves 26 may seal against the reed cage 24 such that air generally cannot pass through the openings 28 of the reed valve assembly 10. Of course, the reed valve assembly 10 can be designed to allow air to still pass through the reed valve assembly 10 when the reed petals 26 are in the seated position.

In the illustrated example, the reed cage 24 includes two outer openings 28a on the opposing sides of the outside 27 of the W and two inner openings 28b on opposing sides of the inside of the W. Of course, it should be appreciated that the inner and/or outer sides 27, 29 of the reed cage 24 may have less than and/or two or greater than two openings 28a, 28b. In addition (or alternatively), the reed cage 24 may include a single reed cage 24 (as described herein) which may form a generally W-shaped cross-section. Moreover, any of the reed cages 24 described herein may have other cross-sectional shapes (either singularly or in combination).

Figure 6:
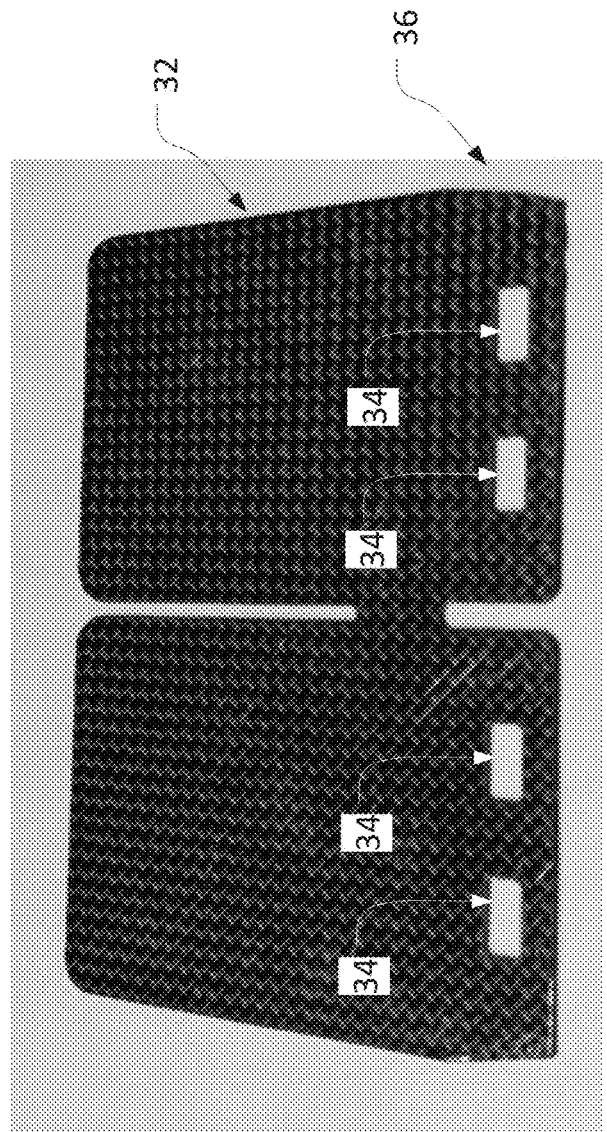
FIG. 6 is a side view of one example a reed petal consistent with the present disclosure.

Turning now to FIG. 6, one example of a reed petal 26 is generally illustrated. The illustrated reed petal 26 is configured to cover/seal two openings 28; however, it should be appreciated that the reed petal 26 may take any other form known to those skilled in the art. The use of a single inner and/or outer reed petal 26a, 26b to cover/seal multiple openings 28 reduces the number of parts that need to be assembled. Alternatively, one or more of the openings 28 may be covered/sealed by individual reed petals 26 (e.g., each opening 28 may be covered/sealed by a different reed petal 26). In any event, the reed petal 26 includes a flexible body 32 configured to extend across and cover/seal the opening 28. The flexible body 32 may be made from carbon fiber, plastic, metal, and/or the like. The reed petal 26 (e.g., the body 32) may include one more holes 34 configured to receive outer petal tabs 1002 formed in the reed cage 24 and/or retainer 22 as described herein. The holes 34 may be disposed proximate the bottom (base) 36 of the reed valve 26.

Figure 7:
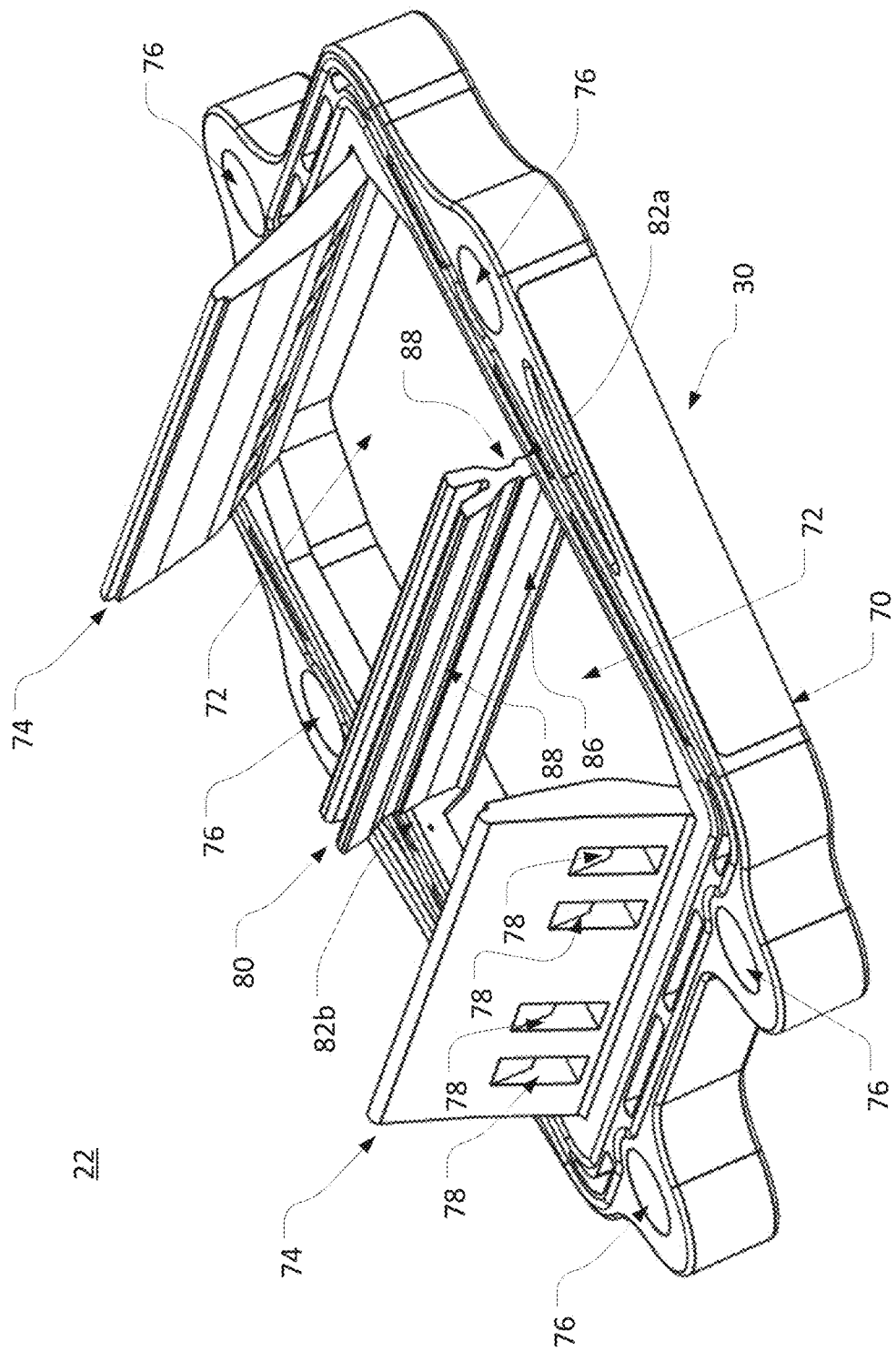
FIG. 7 is a perspective view of one example a retainer consistent with the present disclosure.
Figure 8:
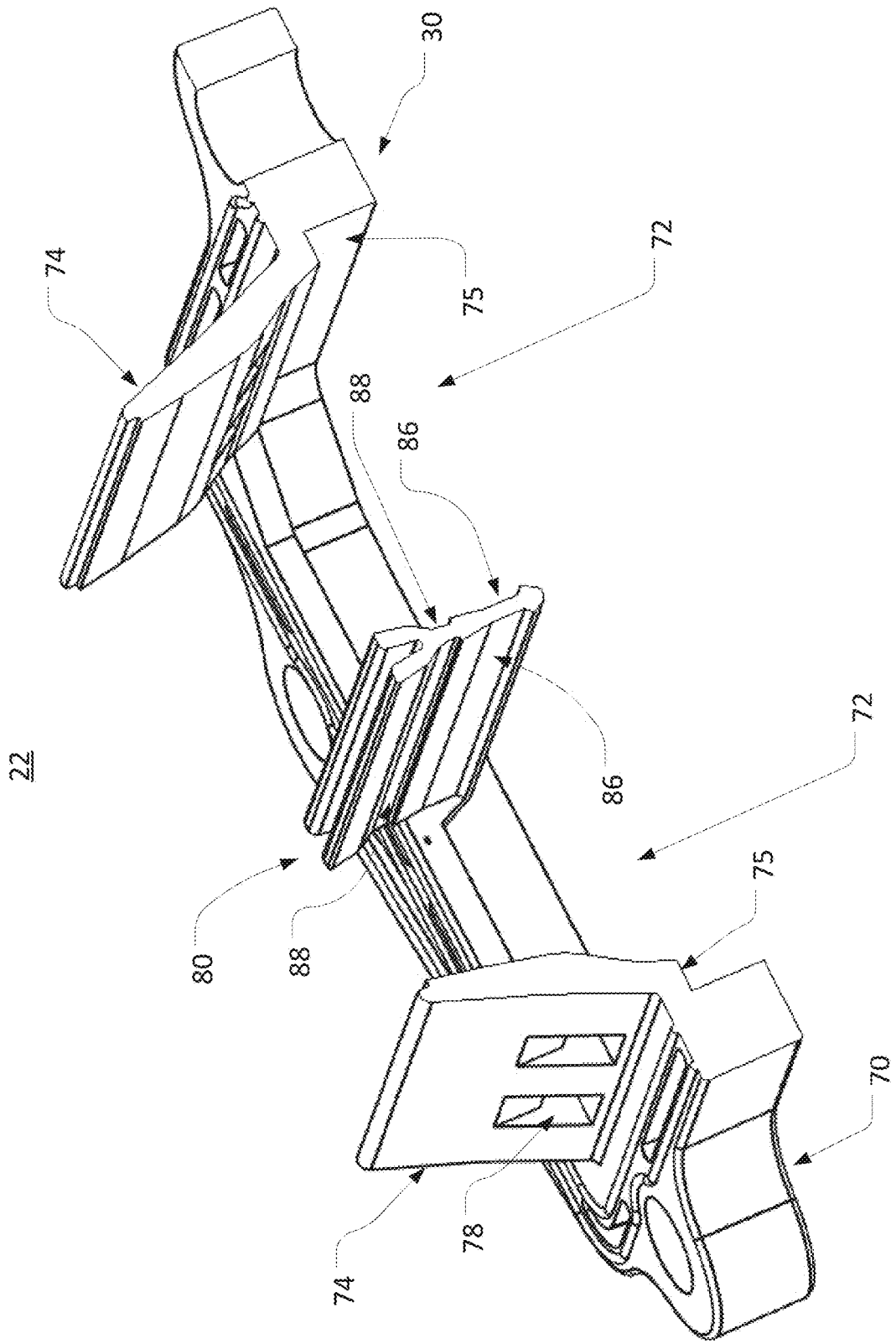
FIG. 8 is a first cross-sectional view of the retainer of FIG. 7.
Figure 9:
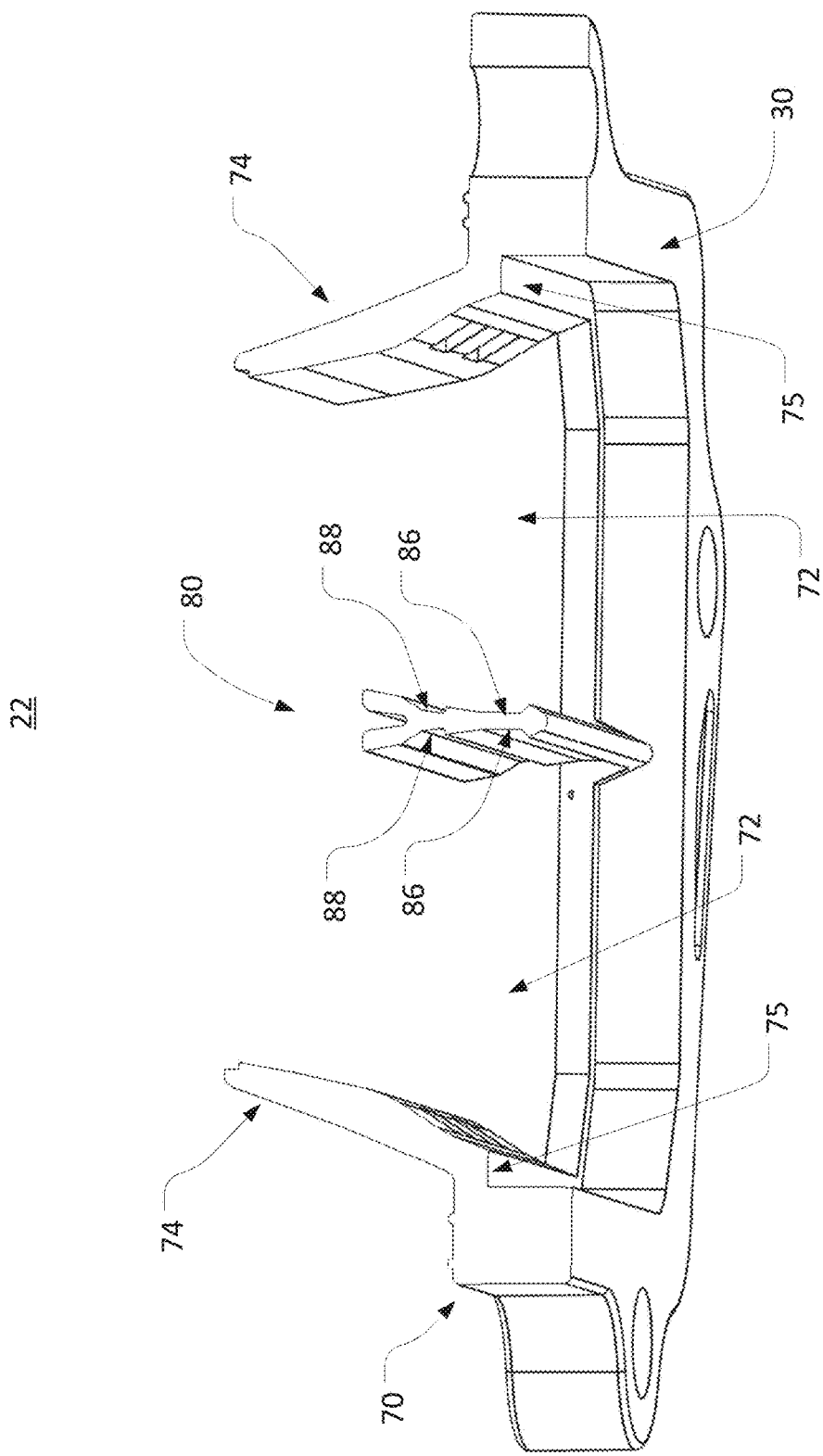
FIG. 9 is a first cross-sectional view of the retainer of FIG. 7.

Turning now to FIGS. 7-9, one example of a retainer 22 consistent with the present disclosure is generally illustrated. In particular, FIG. 7 is a perspective view of the retainer 22 and FIGS. 8-9 are cross-sectional views of the retainer 22.

The retainer 22 includes a flange 70, two or more openings 72, and optionally one or more reed stops 74. The flange 70 may define a perimeter of the retainer and may include one or more bolt/screw holes 76 for securing the retainer 22 (and the reed valve assembly 20) to an intake system or other engine component. The reed stops 74 may be configured to limit the opening movement of the reed petals 26 (e.g., the outer reed petals 26a) and keep the reed petals 26 from pivoting too far. The reed stops 74 may extend at least partially perpendicularly from the flange 70 and may be slightly arced to conform to the natural bending of the reed petals 26 as they open.

Figure 10:
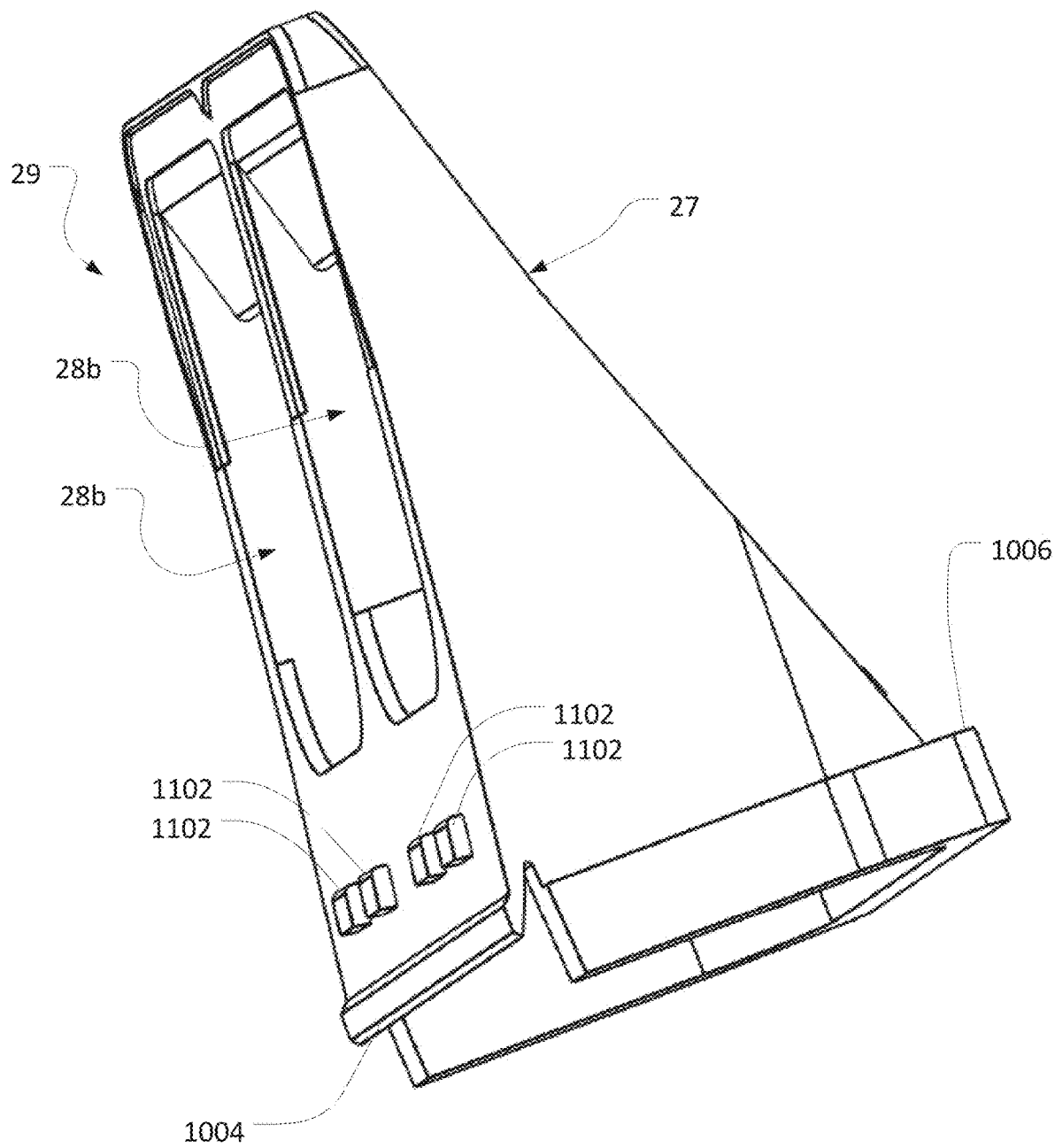
FIG. 10 is a perspective view of one example a reed cage consistent with the present disclosure.
Figure 11:
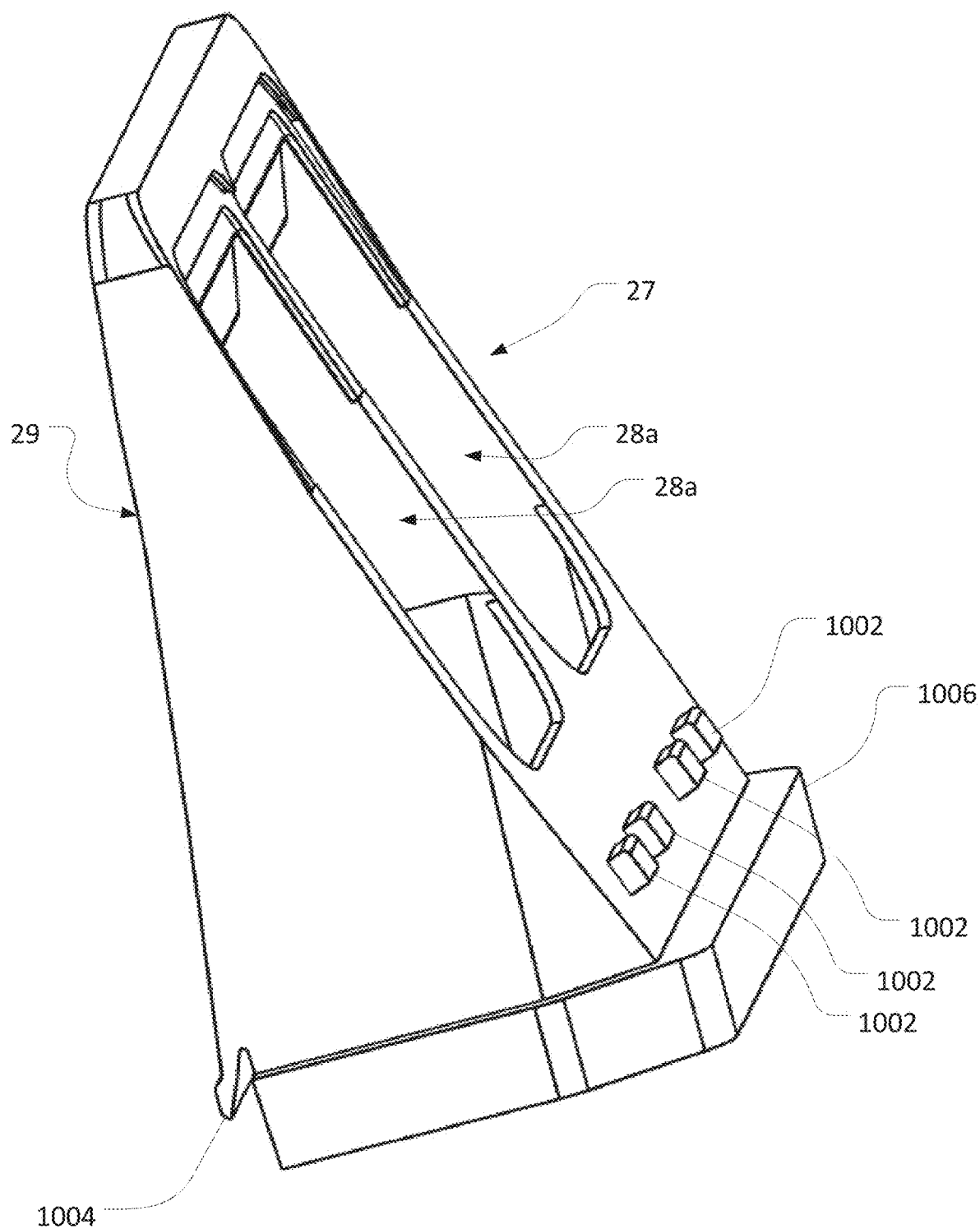
FIG. 11 is another perspective view of the reed cage of FIG. 10.

The retainer 22 may include one or more petal slots 78 configured to receive one or more outer petal tabs 1002 (see FIGS. 10-11) associated with the reed cage 24 as the reed cage 24 is advanced into the openings 72 through the bottom 30 of the retainer 22. The petal slots 78 may extend through the retainer 22 (e.g., through the reed stop 74) and/or partially into the retainer 22 (e.g., partially through the reed stop 74). The outer petal tabs 1002 may be configured to deflect and/or resilient deform as reed cage 24 is advanced into the retainer 22 and lock into the petal slots 78 to secure the reed cage 24 to the retainer 22. Similar to U.S. Pat. No. 6,880,577, the holes 34 of the outer reed petals 26a may also receive the outer petal tabs 1002 to secure the outer reed petals 26a between the retainer 22 and the reed cage 24 as the reed cage 24 and outer reed petals 26a are advanced into the retainer 22. It should be appreciated; however, that the arrangement of the petal slots 78 and outer petal tabs 1002 may be reversed, i.e., the reed cage 24 may include the petal slots 78 and the retainer 22 may include the outer petal tabs 1002.

As noted above, the openings 72 may be configured to receive the reed cage 24 and reed petals 26. As explained herein, the reed cage 24 may be a single reed cage (e.g., having a W cross-section) or two or more reed cages (e.g., forming a W cross-section). In any event, the reed cage 24 is inserted through the bottom 30 of the retainer 22 and at least partially through the openings 72. The two or more openings 72 may be at least partially separated by one or more center retainers 80. The center retainer 80 may be formed integrally with the retainer 22. For example, the center retainer 80 may be formed along with the rest of the retainer 22 during a single molding process. Alternatively, the center retainer 80 may be formed separately from the rest of the retainer 22. In at least one example, the center retainer 80 may be secured (e.g., using an adhesive and/or welding (such as ultrasonic welding or the like)) and/or secured using one or more fasteners (e.g., but not limited to, tabs, detents, snaps, interference/frictional connections, mechanical interference connection, and/or the like).

Figure 12:
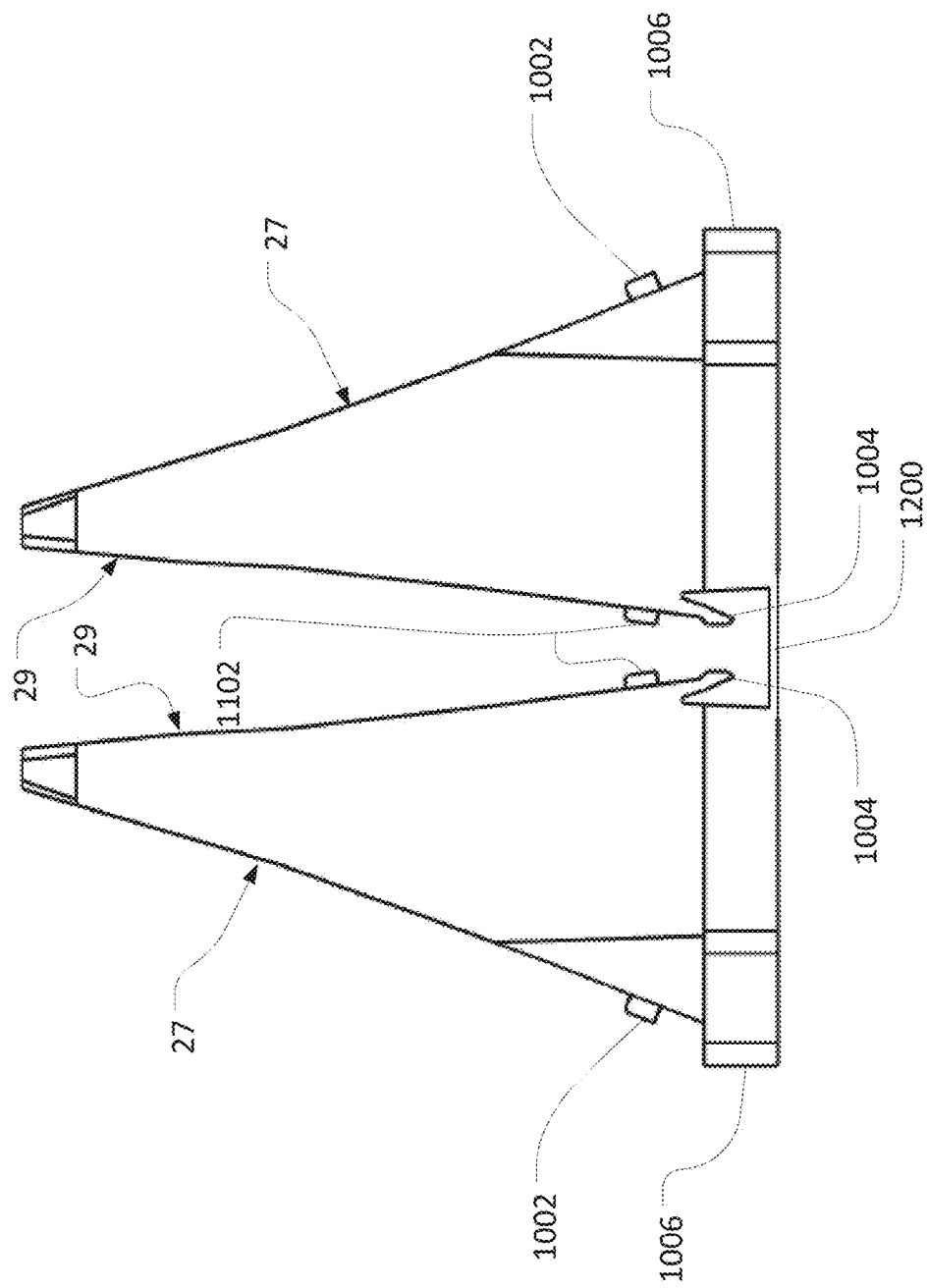
FIG. 12 is a side view of another example a reed cage consistent with the present disclosure.
Figure 13:
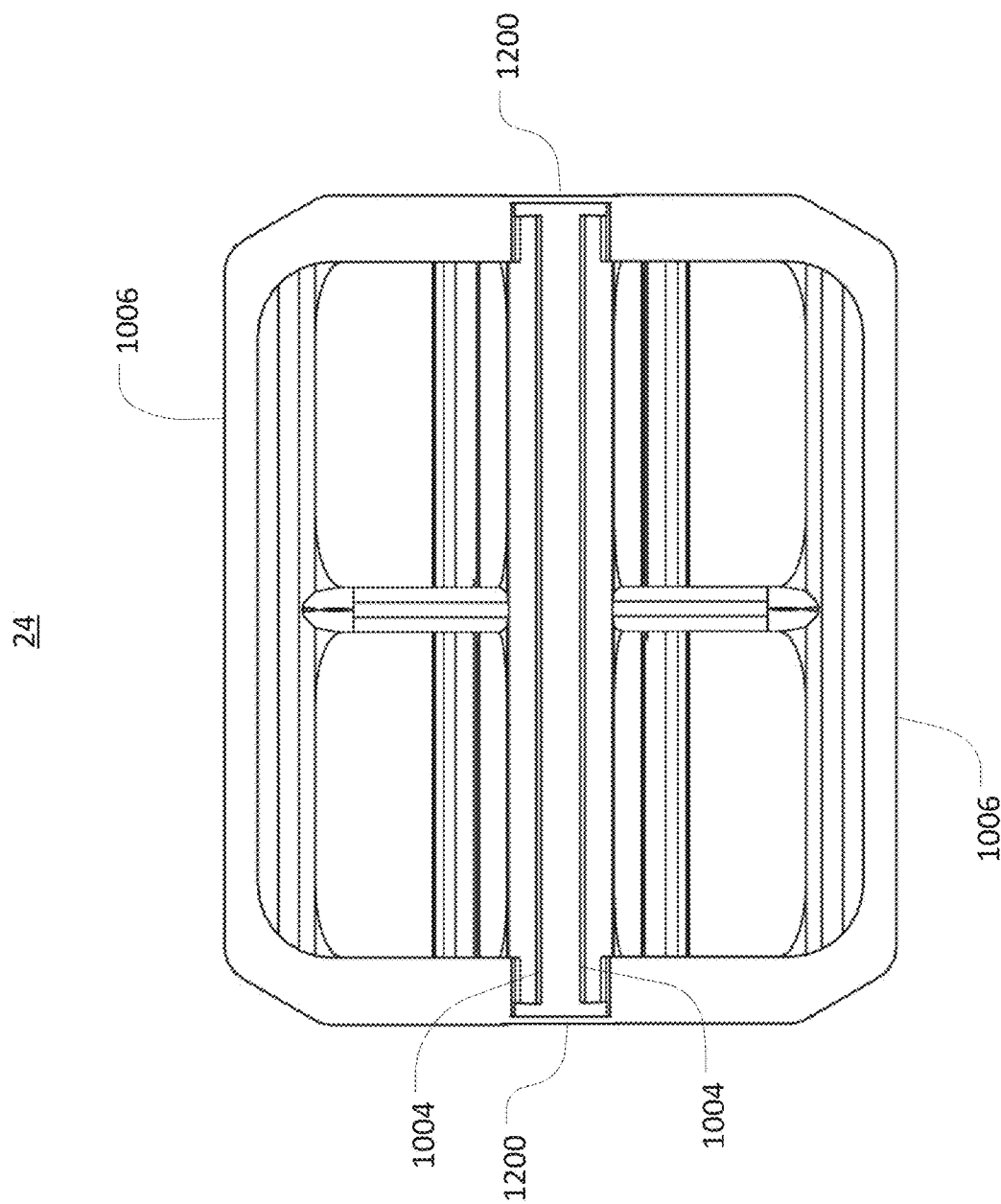
FIG. 13 is a bottom view of the reed cage consistent of FIG. 12.

In the illustrated example, the center retainer 80 extends from one side 82a of the flange 70 to an opposite side 82b of the flange 70. The center retainer 80 may be configured to form two openings 72 having approximately the same size and/or dimensions. In at least one example, a portion of the center retainer 80 extends above the top surface 84 of the flange 70. Alternatively (or in addition), a portion of the center retainer 80 may be disposed above the bottom 30 of the retainer 22 (e.g., above the bottom of the flange 70). As can be seen, e.g., in FIG. 5, having the bottom of the center retainer 80 above the bottom 30 of the retainer 22 allows a single reed cage 24 (see, e.g., FIGS. 12-13) to be advanced through the bottom 30 and extend through the openings 72 of the retainer 22 while being flush or recesses relative to the bottom 30 of the retainer 22. With reference to FIGS. 12-13, the single piece reed cage 24 may include one or more interconnects 1200 that connect two or more portions of the reed cage 24 (e.g., two reed cages 24 generally illustrated in FIGS. 10-11) into a single piece reed cage 24 as shown in FIGS. 12-13. If the center retainer 80 extended below the bottom 30 of the retainer 22, then a single piece reed cage 24 would also have be disposed below the bottom 30 of the retainer 22. For example, the interconnects 1200 would have to be disposed below the bottom 30 of the retainer 22.

With reference to FIGS. 5 and 8-12, the center retainer 80 includes one or more reed cage grooves, channels, slots, and/or recesses 86 and/or one or more petal grooves, channels, slots, and/or recesses 88 configured to receive one or more reed cage flange, tabs, protrusions, and/or detents 1004 and inner petal tabs 1102 of the reed cage 24, respectively. In the illustrated example, the center retainer 80 includes a single reed cage groove 86 and a single petal groove 88 extending substantially along the entire length of the center retainer 80; however, it should be appreciated that the center retainer 80 may include one or more reed cage grooves 86 and/or and one or more petal grooves 88 extending along only a portion of the center retainer 80. The petal groove 88 may be disposed above the reed cage groove 86. In at least one example, at least a portion of the petal groove 88 may be disposed flush and/or above the upper surface 87 of the retainer 22 (e.g., flush and/or above the upper surface of the flange 70) and at least a portion of the reed cage groove 86 may be disposed flush and/or below the upper surface 87 of the retainer 22 and/or flush or above the bottom surface 30 of the retainer 22 (e.g., flush and/or below the upper surface of the flange 70 and flush or above the bottom surface of the flange 70). The reed cage 24 may optionally include a lip 1006 extending outwardly beyond the body 1008 of the reed cage 24 that is configured to be received at least partially through the openings 72 of the retainer 22. The lip 1008 may be configured to engage a portion of the opening 72 (e.g., a shoulder or the like 75) and generally prevent over insertion of the reed cage 24 relative to the retainer 22.

The reed cage groove 86 may be configured to receive the reed cage flange 1004 of the reed cage 24 (e.g., while being advanced from the bottom 30 of the retainer 22) and generally lock (e.g., fix) the position of the reed cage 24 relative to the retainer 22. The inner petal tabs 1102 of the reed cage 24 may extend through the holes 34 of the inner reed petals 26b and extend into the petal groove 88 (e.g., while being advanced from the bottom 30 of the retainer 22) to secure the inner petals 26b. In some examples, the reed cage groove 86 and the petal groove 88 (along with the reed cage flange 1004 and the inner petal tabs 1102) may work in combination to generally lock (e.g., fix) the position of the reed cage 24 relative to the retainer 22. In any event, the reed cage 24 (along with petals 26) may be secured to the retainer 22 in a bottom to top arrangement without the use of additional tools and/or means. It should be appreciated that the arrangement of the reed cage groove 86 and the reed cage flange 1004 and/or the arrangement of the petal groove 88 and the reed cage flange 1004 may be reversed. Put another way, the reed cage groove 86 may be formed in the reed cage 24 and the reed cage flange 1004 may be formed in the center retainer 80. Similarly, the petal groove 88 may be formed in the reed cage 24 and the reed cage flange 1004 may be formed in the center retainer 80. In some examples, the reed cage flange 1004 may extend outwardly and downwardly and may be configured to be resiliently bent and/or deformed while the reed cage 24 is being advanced through the openings 72 of the retainer 22, thereby allowing the reed cage flange 1004 to snap back into the reed cage groove 86. Once the reed cage flange 1004 is generally received in the reed cage groove 86, the reed cage 24 cannot be removed without bending/deforming the reed cage flange 1004 generally inwardly and away from the reed cage groove 86.

Figure 14:
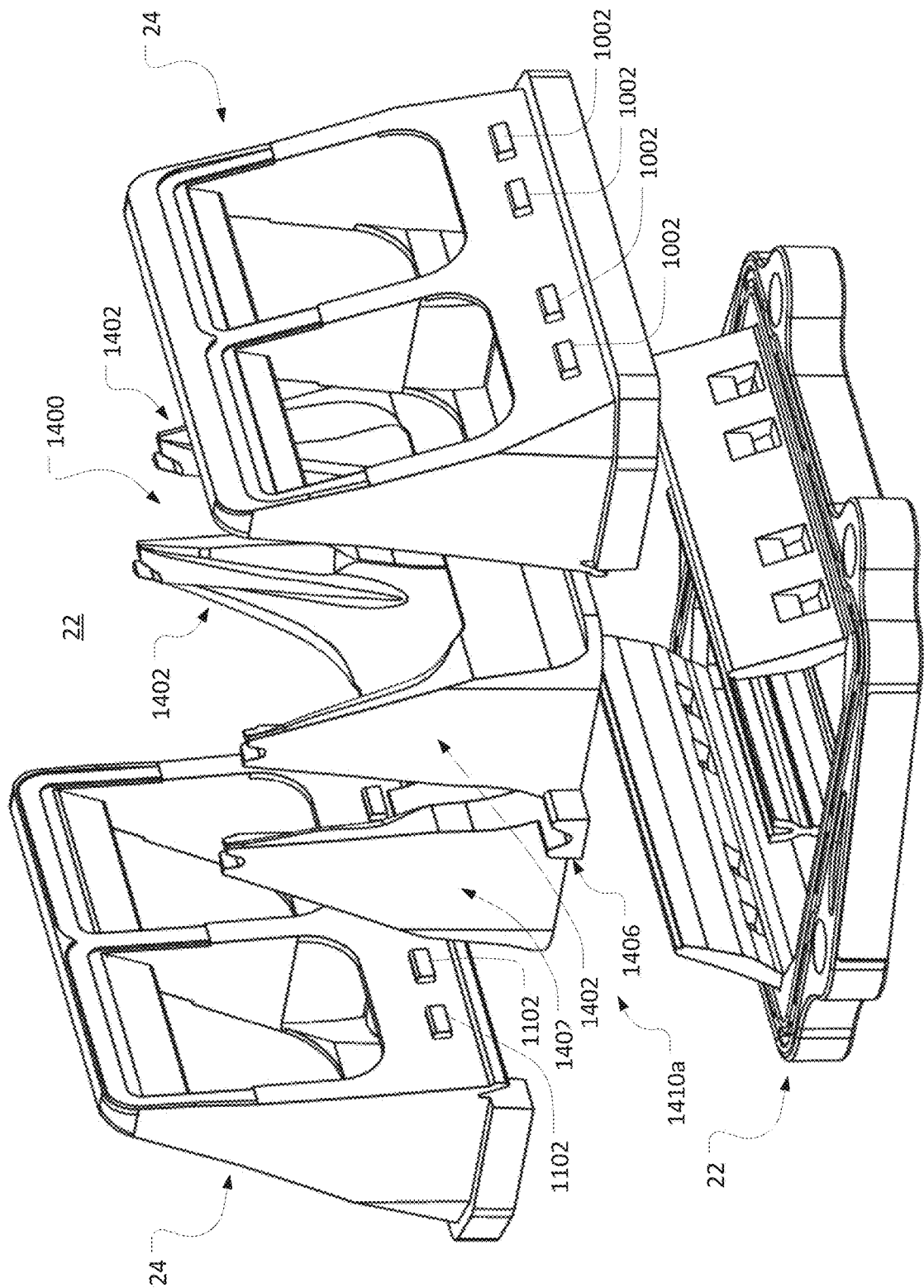
FIG. 14 is an exploded view of another example of a reed valve assembly including an air guide consistent with the present disclosure.
Figure 15:
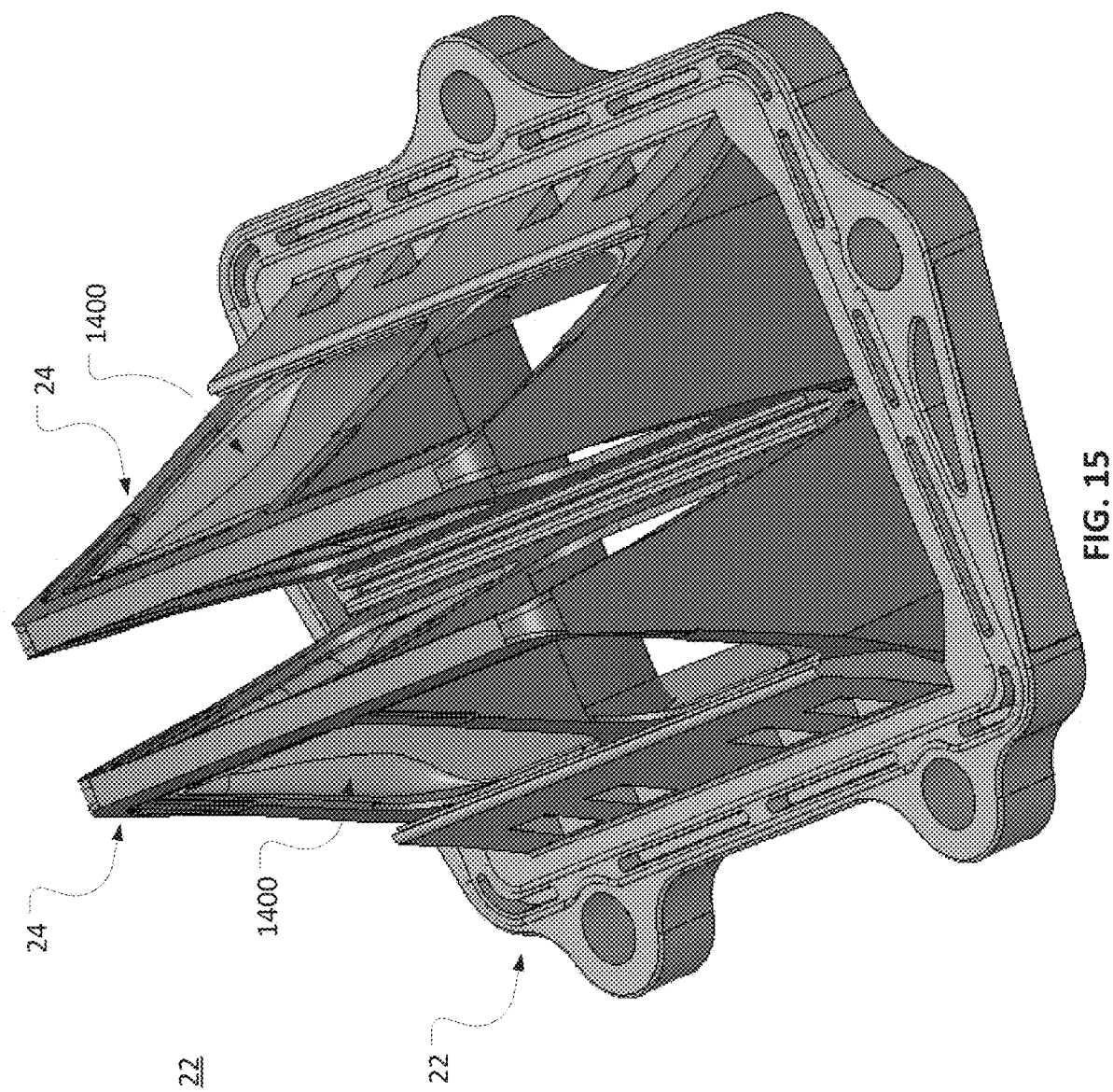
FIG. 15 is an assembled top view of the reed valve assembly of FIG. 14.
Figure 16:
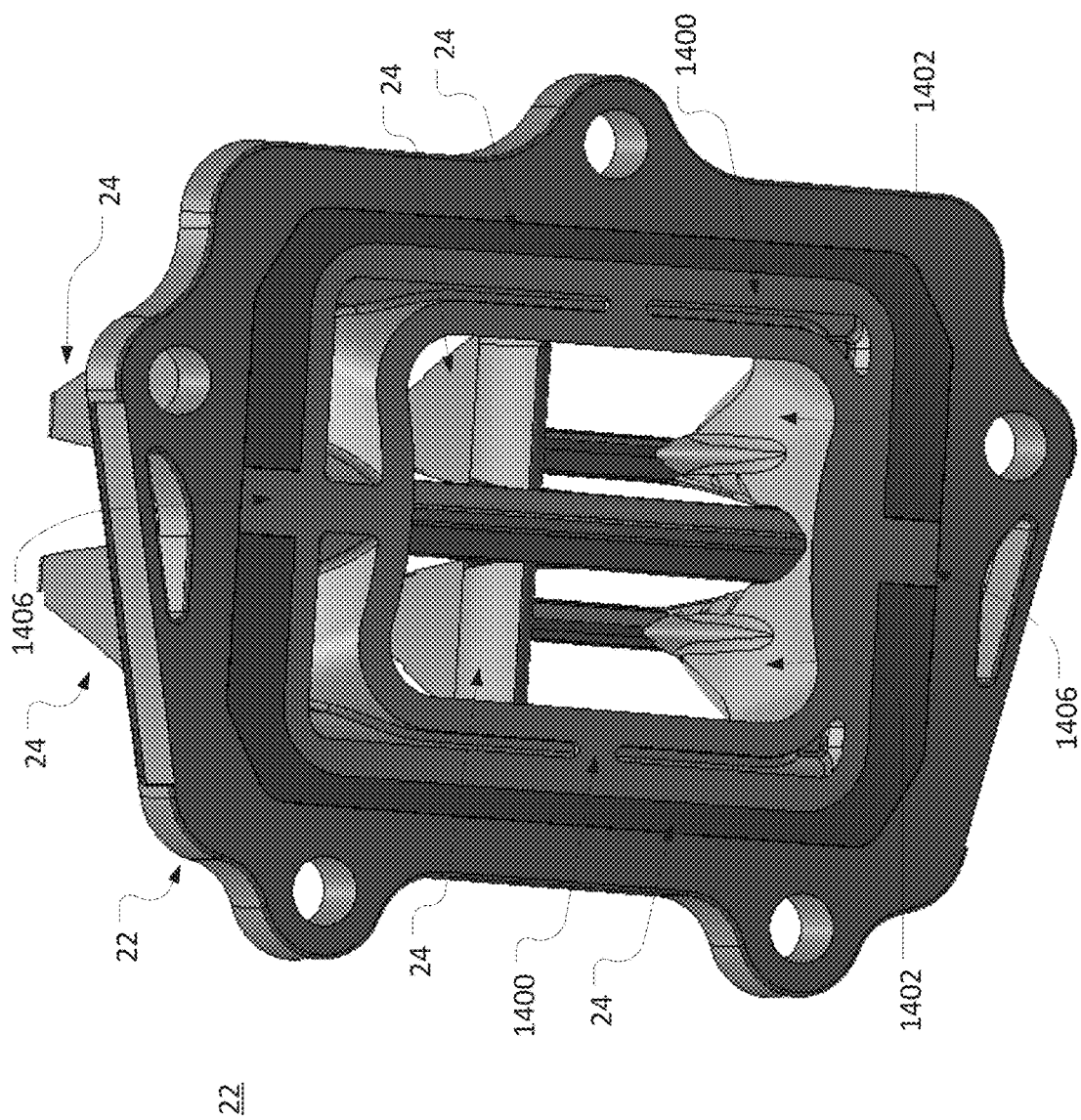
FIG. 16 is an assembled bottom view of the reed valve assembly of FIG. 14.
Figure 17:
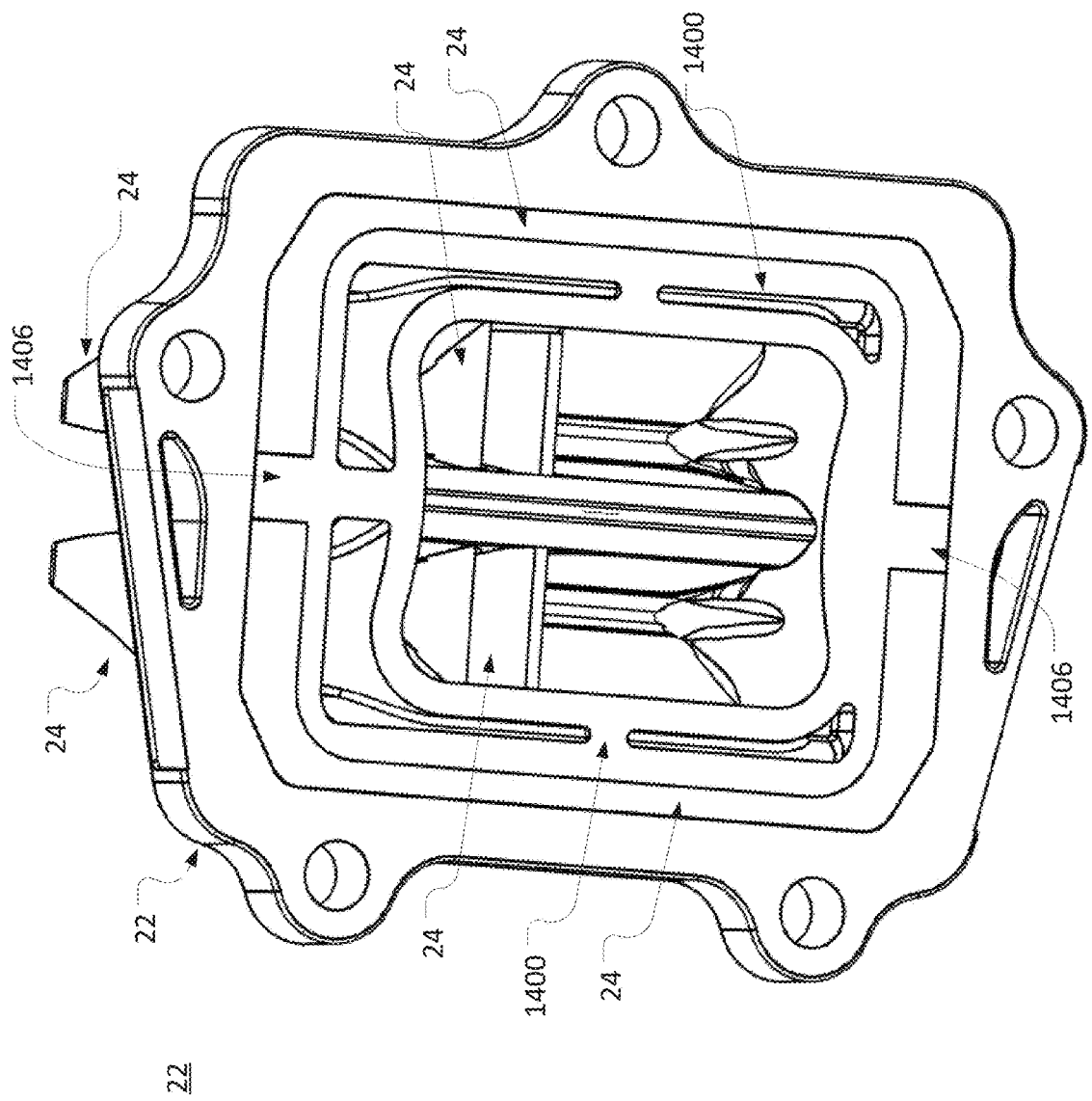
FIG. 17 is an assembled bottom view of the reed valve assembly of FIG. 14.
Figure 18:
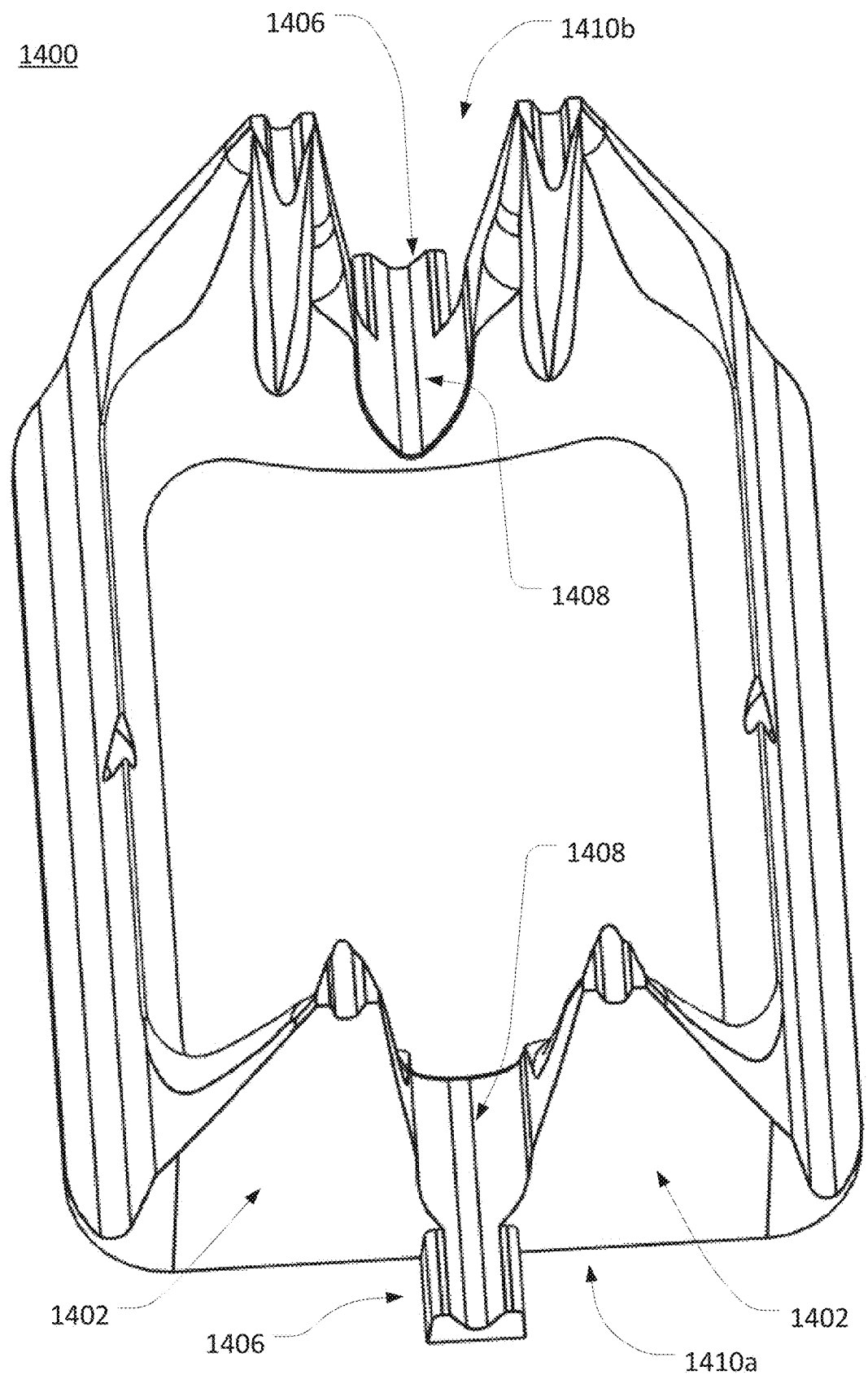
FIG. 18 is a top view of the air guide of FIG. 14.
Figure 19:
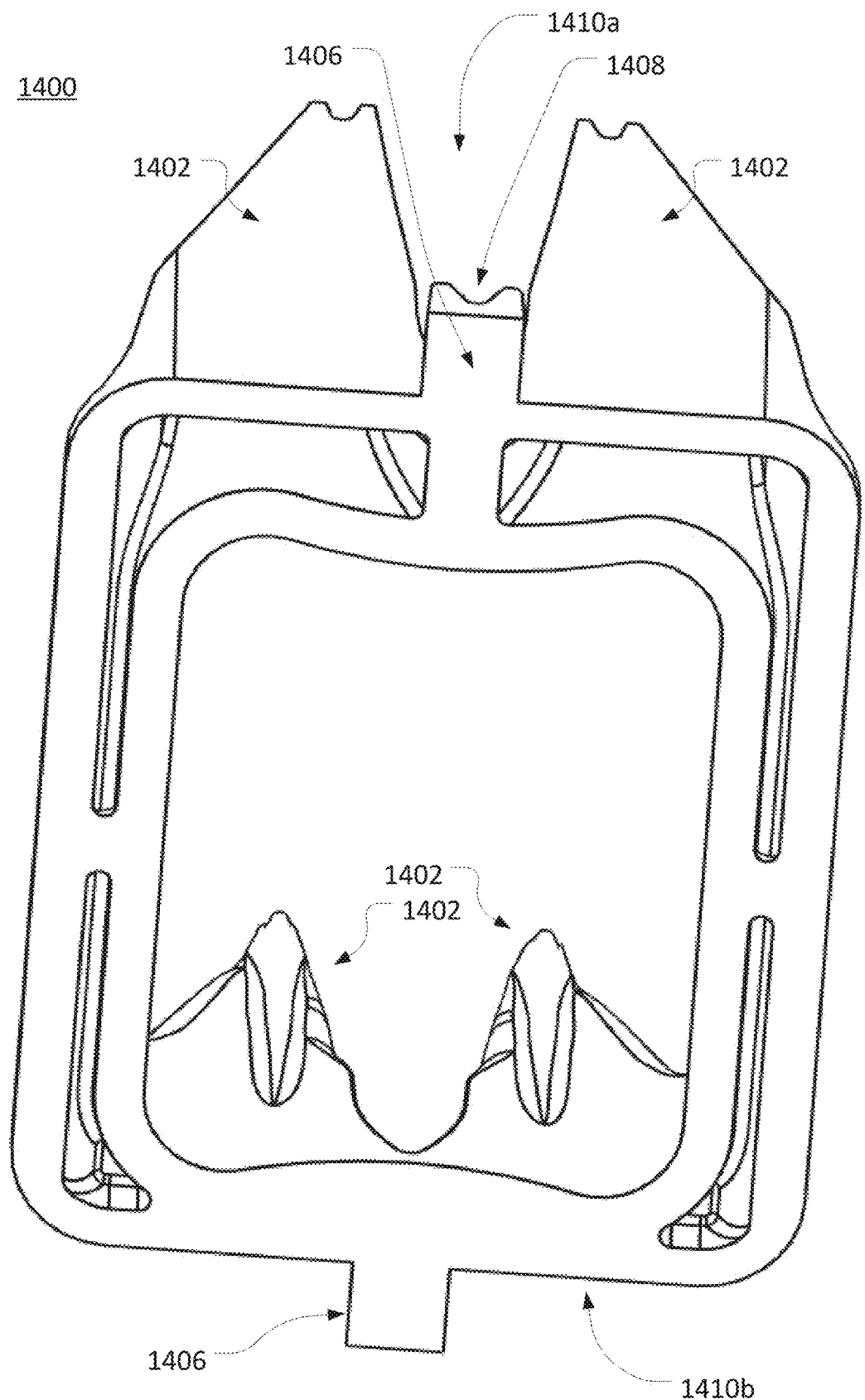
FIG. 19 is a bottom view of the air guide of FIG. 14.

Turning now to FIGS. 14-19, the reed valve assembly 20 may optionally include one or more air guides 1400. In particular, FIG. 14 is an exploded view of the reed valve assembly 20 with the air guide 1400, FIG. 15 is an assembled top view of the reed valve assembly 20 with the air guide 1400, FIGS. 16 and 17 are an assembled bottom view of the reed valve assembly 20 with the air guide 1400, FIG. 18 is a top view of the air guide 1400, and FIG. 19 is a bottom view of the air guide 1400. The air guide 1400 may be advance at least partially through the bottom 30 of the retainer 22 to aid in securing the reed cage 24 (and also the reed petals 26) to the retainer 22. The air guide 1400 may include a body portion 1402 configured to extend at least partially within the passageway of the reed cage 24. The body portion 1402 may be configured to aid in air flow through the reed valve assemble 20. The air guide 1400 may also include one or more locking projections 1406. The locking projections 1406 may be configured to aid in securing the reed cage 24 to the retainer 22. For example, the locking projections 1406 may include a V-shaped snap groove 1408 that may engage with the reed cage 24 and/or the retainer 22 (e.g., the center retainer 70). In the illustrated example, the air guide 1400 includes a first and a second locking projection 1406 ending outwardly from opposites sides 1410a, 1410b of the air guide 1400.

Figure 1:
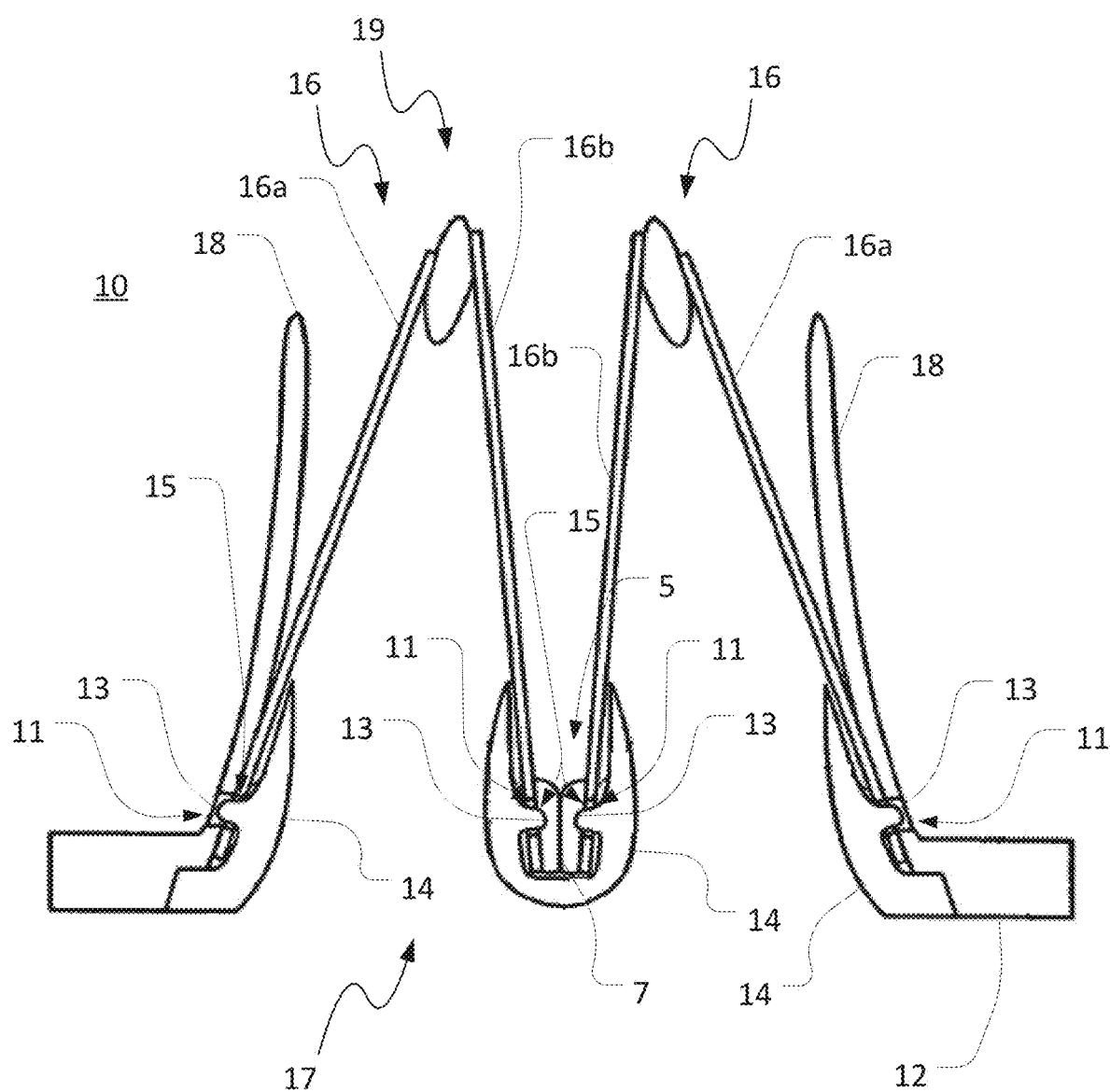
FIG. 1 is a cross-sectional view of a prior art reed valve.

As may be appreciated, one or more of the center retainers 80 consistent with the present disclosure allows for the elimination of the separate inserts 7 (e.g., FIG. 1) used to hold the inner reed petals and/or reed cages in prior designs. Elimination of the separate inserts 7 may reduce the number of components that are necessary to assemble a reed valve assembly 20. In addition, elimination of the separate inserts 7 may allow for all the components to assembled in a front-back direction (e.g., stack) and eliminates the need to install parts from the side. The center retainer 80 provides for retention of the reed cages 24 using a tool-less assembly, for example, in only a front-back direction, not a combination of front-back and left-right. The reed cage design of the present disclosure allows for the parting line to be split left/right vs top/bottom, thereby facilitating overmolding and allowing for detailed tip geometry not previously possible. An optional air guide blocks the cage-manifold snap from releasing.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the claims.

The invention claimed is:

1. A reed valve assembly comprising:
   a retainer including a flange, a first and a second openings, and a center retainer separating the first and second openings;
   a first and a second reed cage configured to be advanced partially through the first and second openings of the retainer, respectively, the first and second reed cage each having an inner opening generally facing each other and an outer opening generally facing away from each other, wherein the inner opening and the outer opening of the first and second reed cage are configured to be fluidly coupled to the first and second openings of the retainer;
   a plurality of reed petals including a first and a second outer reed petal configured to extend over the outer opening of the first and second reed cage, respectively, and a first and a second inner reed petal configured to extend over the inner opening of the first and second reed cage, respectively, each of the plurality of reed petals having at least one hole;
   wherein the center retainer includes a plurality of reed cage grooves a plurality of petal grooves and the first and second reed cage each include a reed cage flange and a plurality of inner petal tabs configured to form a snap connection that secures the first and second reed cage to the retainer.

2. The reed valve assembly of claim 1, wherein the retainer includes a plurality of petal slots and the first and second reed cage each include a plurality of outer petal tabs, the outer petal tabs configured to extend through the holes of the outer reed petals and into the petal slots.

3. The reed valve assembly of claim 2, wherein the retainer includes a plurality of petal stops defining the petal slots.

4. The reed valve assembly of claim 1, wherein the plurality of petal grooves are disposed above the reed cage grooves and wherein the plurality of inner petal tabs are disposed above the reed cage flanges.

5. The reed valve assembly of claim 1, wherein the first and second reed cages collectively have a W cross-sectional shape when received in the first and second openings of the retainer.

6. A reed valve assembly comprising:
   a retainer including a flange, a first opening, a second opening, a first petal slot, and a center retainer disposed between and partially defining both the first opening and second opening, the center retainer including a first reed cage groove and a second reed cage groove, a first petal groove, and a second petal groove;
   a first reed cage configured to be advanced from a bottom of the retainer and partially through the first opening of the retainer, the first reed cage including a first inner opening, a first outer opening configured to be fluidly coupled to the first opening of the retainer, and a first reed cage flange configured to form a snap connection with the first reed cage groove;
   a second reed cage configured to be advanced from the bottom of the retainer and partially through the second opening of the retainer, the second reed cage including a second inner opening, a second outer opening configured to be fluidly coupled to the second opening of the retainer, and a second reed cage flange configured to form a snap connection with the second reed cage groove;
   a first inner reed petal configured to extend over the first inner opening;
   a second inner reed petal configured to extend over the second inner opening;
   a first outer reed petal configured to extend over the first outer opening; and
   a second outer reed petal configured to extend over the second outer opening;
   wherein the first and the second inner openings generally facing each other and the first and the second outer opening generally facing away from each other;
   wherein the first reed cage includes a first outer petal tab and a first inner petal tab, the first outer petal tab configured to extend through a hole formed in the first outer reed petal and into the first petal slot, the first inner petal tab configured to extend through a hole formed in the first inner reed petal and into the first petal groove, wherein the first groove is disposed above the first reed cage groove and wherein the first inner petal tab is disposed above the first reed cage flange.

7. The reed valve assembly of claim 6, wherein the retainer includes a petal stop defining the first petal slot.

8. The read valve assembly of claim 6, wherein the retainer further includes a second petal slot and wherein the second reed cage further includes a second outer petal tab and a second inner petal tab, the second outer petal tab configured to extend through a hole formed in the second outer reed petal and into the second petal slot, the second inner petal tab configured to extend through a hole formed in the second inner reed petal and into the second petal groove, and wherein the second inner petal tab is disposed above the second reed cage flange.

9. A reed valve assembly comprising:
   a retainer including a flange, a first opening, a second opening, a plurality of petal slots, and a center retainer disposed between and partially defining both the first opening and second opening, the center retainer including a plurality of petal grooves;
   a single reed cage configured to be advanced from a bottom of the retainer and partially through the first and second openings of the retainer, the single reed cage including:
   a plurality of outer petal tabs;
   a plurality of inner petal tabs;
   a first inner opening and a first outer opening configured to be fluidly coupled to the first opening of the retainer; and
   a second inner opening and a second outer opening configured to be fluidly coupled to the second opening of the retainer;

a first inner reed petal configured to extend over the first inner opening;

a second inner reed petal configured to extend over the second inner opening;

a first outer reed petal configured to extend over the first outer opening; and a second outer reed petal configured to extend over the second outer opening;

wherein the first and the second inner openings generally facing each other and the first and the second outer opening generally facing away from each other;

wherein the center retainer includes a plurality of reed cage grooves and the single reed cage includes a plurality of reed cage flanges, the plurality of reed cage grooves and the plurality of reed cage flanges configured to form a snap connection that secures the single reed cage to the retainer; and wherein the outer petal tabs are configured to extend through holes formed in the first outer reed petal and into petal slots and the inner petal tabs configured to extend through holes formed in the first inner reed petal and into the petal grooves, wherein the plurality of petal grooves are disposed above the reed cage grooves and wherein the plurality of inner petal tabs are disposed above the reed cage flanges.

10. The reed valve assembly of claim 9, wherein the retainer includes a plurality of petal stops defining the plurality of petal slots.

* * * * *

UNITED STATES PATENT AND TRADEMARK OFFICE
CERTIFICATE OF CORRECTION

PATENT NO. : 12,196,329 B2
APPLICATION NO. : 18/159695
DATED : January 14, 2025
INVENTOR(S) : Steven M. Tassinari and Michael Ewaschuk Page 1 of 1

It is certified that error appears in the above-identified patent and that said Letters Patent is hereby corrected as shown below:

In the Claims

In Column 8, Line 40, in Claim 8, delete "read" and insert --reed--, therefor.

Signed and Sealed this
Fourth Day of March, 2025

Coke Morgan Stewart
*Acting Director of the United States Patent and Trademark Office*